US008745246B2

(12) United States Patent
Yin et al.

(10) Patent No.: US 8,745,246 B2
(45) Date of Patent: Jun. 3, 2014

(54) METHOD AND DEVICE FOR SELECTING AN SVC OPERATION POINT, AND METHOD AND DEVICE FOR PROVIDING INFORMATION OF SVC OPERATION POINTS

(75) Inventors: Yuejing Yin, Beijing (CN); Yekui Wang, Shenzhen (CN)

(73) Assignee: Huwei Technologies Co., Ltd., Shenzhen (CN)

( * ) Notice: Subject to any disclaimer, the term of this patent is extended or adjusted under 35 U.S.C. 154(b) by 121 days.

(21) Appl. No.: 13/327,277

(22) Filed: Dec. 15, 2011

(65) Prior Publication Data

US 2012/0089740 A1    Apr. 12, 2012

Related U.S. Application Data

(63) Continuation of application No. PCT/CN2010/073946, filed on Jun. 13, 2010.

(30) Foreign Application Priority Data

Jun. 15, 2009   (CN) .......................... 2009 1 0145963
Sep. 30, 2009   (CN) .......................... 2009 1 0179091

(51) Int. Cl.
    *G06F 15/16*    (2006.01)
(52) U.S. Cl.
    USPC ............................ 709/227; 709/228; 709/229
(58) Field of Classification Search
    USPC ........................................................ 709/227
    See application file for complete search history.

(56) References Cited

U.S. PATENT DOCUMENTS

| 2005/0254575 | A1 | 11/2005 | Hannuksela et al. |
| 2006/0291386 | A1* | 12/2006 | Jyske et al. ................ 370/230 |
| 2008/0095230 | A1 | 4/2008 | Hannuksela et al. |
| 2009/0003439 | A1 | 1/2009 | Wang et al. |

FOREIGN PATENT DOCUMENTS

| CN | 1973545 A | 5/2007 |
| CN | 101557510 A | 10/2009 |
| WO | WO 2005/011264 A2 | 2/2005 |
| WO | WO 2009/124489 A1 | 10/2009 |

OTHER PUBLICATIONS

Wenger, S. et al. "RTP Payload Format for SVC Video". Dec. 2008. IETF Trust (2008).*
Written Opinion of the International Searching Authority dated Sep. 23, 2010 in connection with International Patent Application No. PCT/CN2010/073946.
Partial Translation of Office Action dated Dec. 5, 2011 in connection with Chinese Patent Application No. 200910179091.9.

(Continued)

*Primary Examiner* — Glenton B Burgess
*Assistant Examiner* — Angela Nguyen

(57) ABSTRACT

A method for selecting an SVC operation point is provided, which includes: receiving an SDP message, where the SDP message includes a unique ID of each operation point and characteristic parameters of at least one operation point of multiple operation points, where the unique ID includes a layer-ID; selecting an operation point from the multiple operation points; and sending a session setup request that includes the unique ID of the selected operation point. A server device and a client device are also provided. Through the method and the device, each operation point may be uniquely identified, and the mapping relationship between each operation point and characteristic parameters is clarified.

2 Claims, 9 Drawing Sheets

(56) References Cited

OTHER PUBLICATIONS

International Search Report dated Sep. 23, 2010 in connection with International Patent Application No. PCT/CN2010/073946.
Ye-Kui Wang, et al., "System and Transport Interface of SVC", IEEE Transactions on Circuits and Systems for Video Technology, vol. 17, No. 9, Sep. 2007, p. 1149-1163.

Supplementary European Search Report dated Aug. 28, 2012 in connection with European Patent Application No. EP 10 78 8929.
"H.264 Annex A, Profiles and levels", 60 pages.
S. Wenger, et al., "RTP Payload Format for SVC Video", Audio/Video Transport WG, Mar. 6, 2009, 101 pages.

* cited by examiner

METHOD AND DEVICE FOR SELECTING AN SVC OPERATION POINT, AND METHOD AND DEVICE FOR PROVIDING INFORMATION OF SVC OPERATION POINTS

CROSS-REFERENCE TO RELATED APPLICATIONS

This application is a continuation of International Application No. PCT/CN2010/073946, filed on Jun. 13, 2010, which claims priority to Chinese Patent Application No. 200910145963.X, filed on Jun. 15, 2009 and Chinese Patent Application No. 200910179091.9, filed on Sep. 30, 2009, all of which are hereby incorporated by reference in their entireties.

TECHNICAL FIELD

The present invention relates to the field of video communications technologies, and in particular, to a method and device for selecting a scalable video coding (SVC) operation point, and a method and device for providing information of SVC operation points.

BACKGROUND

An SVC file format is extended on the basis of an H.264/advanced video coding (AVC) file format, and keeps backward compatibility with the AVC file format. The SVC file format is very flexible, and streams may be stored in various forms. For example, a whole stream is stored as a media track or as multiple media tracks according to multiple operation points or by layers; and a subset of required streams may be extracted simply and quickly according to information provided by an extractor track, sample grouping, or a meta data track.

SVC has scalability capabilities in three dimensions: time, space, and quality. The layers in these three dimensions may be identified by temporal_id, dependency_id, and quality_id respectively, which are briefly referred to as (T, D, Q). A group of (T, D, Q) values may uniquely identify a layer or video description corresponding to the layer. A piece of content may generate a stream including multiple layers after being encoded, where the layers include a basic layer and one or more enhanced layers. Through different combinations of the basic layer and enhanced layers, video descriptions of different bit rates, different frame rates, different resolutions, and different quality can be provided.

A Real-time Transport Protocol (RTP) for SVC provides a concept of an SVC operation point. One operation point is identified by a group of (T, D, Q). A bit stream corresponding to an operation point consists of a layer identified by the (T, D, Q) and all network abstraction units (NALs) of the layer. To describe the characteristics of the operation point, a Session Description Protocol (SDP) parameter sprop-operation-point-info is defined, and forms of the parameter are, for example, sprop-operation-point-info=<1,0,0,0,4d400a, 3200,176,144,128,256>, <2,1,1,0,53000c,6400,352,288, 256,512>, where each pair of angle brackets includes parameters for describing one operation point and the ten parameters included in each angle brackets are respectively as follows: layer-ID, temporal-ID, dependency-ID, quality-ID, profile-level-ID, avg-framerate, Width, Height, avg-bitrate, and max-bitrate. These parameters correspond to different parameters of operation points. In addition, another SDP parameter sprop-scalability-info is defined. The sprop-scalability-info parameter directly provides content of the NAL corresponding to a Scalability Information SEI Message, and includes available layers (operation points) in the SVC stream and specific parameters of each layer (operation point). Each parameter in sprop-operation-point-info is extracted from the sprop-scalability-info parameter.

Packet-switched Streaming Service (PSS) is a protocol that is implemented over the Real Time Streaming Protocol (RTSP) and for providing streaming services, and can provide video-on-demand (VOD) and live content for mobile terminals.

The 3GPP file format (abbreviated to 3GP) is the main form of the content source of a PSS streaming server. The PSS specification defines a stream ID for the control URL in the attribute "a=control" of each media layer according to the 3GPP file format, where the stream ID is placed at the end of the control URL path. This stream ID is defined by the track-ID of a corresponding media track in the 3GPP file. The server finds this stream ID in the URL of a SETUP request sent from the client, and maps the stream ID to a matched media track in the 3GPP file. That is, when the 3GPP file has multiple media streams, for example, multiple audio streams and video streams, the track-ID may uniquely identify each different media stream.

In addition, the PSS protocol further defines an alt attribute to provide multiple options for an SDP attribute, for example, multiple options of bandwidths and languages.

In the selection of an operation point, the RTP protocol for SVC defines the operation point information parameter of the SDP.

If each operation point provided by the content source in the SVC format on the server is stored as a media track or an extraction track in the SVC file, each operation point in the SVC file may be uniquely identified by a track-ID. In this case, multiple SVC operation points may be provided directly through prior art of the PSS. Meanwhile, the mapping relationship among the control URL, alt attribute, application bandwidth and track-ID in the PSS SDP description and the RTSP SETUP request, and the operation point information parameter of SVC may be used. For live streaming applications, the video signals may be packetized directly for transmission after being encoded, and do not use the file format. In this case, the foregoing track-ID does not need to be used, but the layer-ID is directly used to describe the media control URL of SDP or RTSP.

Although the selection mechanism of streams in the PSS and the operation point information parameter of SVC are fully used, during the implementation of the present invention, the inventor discovers that the prior art has at least the following weaknesses:

1. The prior art is applicable to a specific file storage mode only, which limits the flexibility of SVC streams and file formats. When each operation point has a corresponding media track, or an extraction track, each operation point may be uniquely identified by the track-ID. However, in other cases, for example, if the whole SVC stream has only one media track, the track-ID cannot uniquely identify each operation point, and therefore, the prior art is not applicable.

2. Although the alt attribute may provide multiple options for an attribute, for example, bandwidth, video buffer parameter, and track-ID in a corresponding file, the mapping relationship between each operation point and multi-option parameters cannot be determined.

3. When the SVC content source provides a lot of operation points, the SDP description information is too long, which affects SETUP time of the streaming and increases the initial delay.

4. For live streaming applications not using the file format, an ID is also required to identify each SVC operation uniquely, and for describing the media control URL of the SDP or the RTSP. This mechanism is not supported in the prior art.

SUMMARY

An embodiment of the present invention provides a method for providing information of SVC operation points to identify each operation point uniquely and clarify the mapping relationship between each operation point and characteristic parameters, where the method includes:

generating an SDP message, where the SDP message includes a unique ID of each operation point and characteristic parameters of at least one operation point of multiple operation points, and the unique ID includes a layer-ID; and sending the SDP message.

An embodiment of the present invention provides a method for selecting an SVC operation point to identify each operation point uniquely and clarify the mapping relationship between each operation point and characteristic parameters, where the method includes:

receiving an SDP message, where the SDP message includes a unique ID of each operation point and characteristic parameters of at least one operation point of multiple operation points, and the unique ID includes a layer-ID;

selecting an operation point from the multiple operation points according to the characteristic parameters; and sending a session setup request that includes the unique ID of the selected operation point.

An embodiment of the present invention further provides a method for providing information of SVC operation points to clarify the mapping relationship between each operation point and characteristic parameters and shorten the length of SDP description information, where the method includes:

generating an SDP message, where the SDP message includes a unique ID and characteristic parameters of each operation point of multiple operation points, and the unique ID includes a track-ID; and sending the SDP message.

An embodiment of the present invention further provides a method for selecting an SVC operation point to clarify the mapping relationship between each operation point and characteristic parameters and shorten the length of the SDP description information, where the method includes:

receiving an SDP message, where the SDP message includes a unique ID and characteristic parameters of each operation point of multiple operation points, and the unique ID includes a track-ID;

selecting an operation point from the multiple operation points according to the characteristic parameters; and sending a session setup request that includes the unique ID of the selected operation point.

An embodiment of the present invention provides a server device to identify each operation point uniquely and clarify the mapping relationship between each operation point and characteristic parameters, where the server device includes:

a generating module, configured to generate an SDP message, where the SDP message includes a unique ID of each operation point and characteristic parameters of at least one operation point of multiple operation points, where the unique ID includes a layer-ID; and a sending module, configured to send the SDP message.

An embodiment of the present invention further provides a client device to identify each operation point uniquely and clarify the mapping relationship between each operation point and characteristic parameters, where the client device includes:

a receiving module, configured to receive an SDP message, where the SDP message includes a unique ID of each operation point and characteristic parameters of at least one operation point of multiple operation points, where the unique ID includes a layer-ID;

a selecting module, configured to select an operation point from the multiple operation points according to the characteristic parameters; and a sending module, configured to send a session setup request that includes the unique ID of the selected operation point.

In embodiments of the present invention, the SDP message includes a unique ID of each operation point and characteristic parameters of at least one operation point of multiple operation points, where the unique ID includes a layer-ID. In this way, the file storage mode is unlimited, and each operation point can be uniquely identified no matter whether each operation point has a corresponding media track or extraction track, which, improves the flexibility of SVC streams and file formats, and clarifies the mapping relationship between each operation point and characteristic parameters. In addition, for the live streaming applications not using the file format, each SVC operation point can also be identified uniquely.

In the embodiments of the present invention, according to the sequence of operation points in the parameter of stream operation point information, the characteristic parameter values of each operation point of the multiple operation points are listed sequentially in each characteristic parameter item of the SDP message; the unique ID of each operation point of the multiple operation points is listed sequentially in the stream ID of the SDP message; or the characteristic parameter values and corresponding layer-IDs in each operation point of the multiple operation points are included in each characteristic parameter item of the SDP message; the unique ID of each operation point of the multiple operation points is included in the stream ID of the SDP message. Therefore, the mapping relationship between each operation point and the characteristic parameters may be clarified. In addition, when the SVC content source provides a lot of operation points, the length of the SDP description information can be shortened, thereby reducing the streaming setup time and initial delay.

BRIEF DESCRIPTION OF THE DRAWINGS

To make the technical solution in embodiments of the present invention or the prior art clearer, the accompanying drawings used in the description of the embodiments or the prior art are briefly described hereunder. Apparently, the accompanying drawings illustrate only some exemplary embodiments of the present invention, and persons of ordinary skill in the art can derive other embodiments from the accompanying drawings without creative efforts.

DETAILED DESCRIPTION

To make the objective, technical solution, and merit of the present invention clearer, the following describes the present invention in detail with reference to the accompanying drawings and exemplary embodiments. The exemplary embodiments and descriptions thereof of the present invention are used to explain the present invention, but are not intended to limit the present invention.

Embodiment 1

Figure 1:
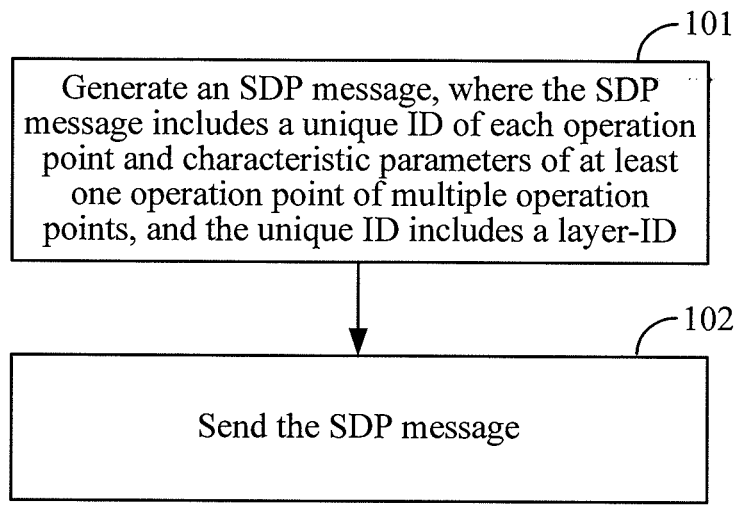
FIG. 1 is a flowchart of a method for providing information of SVC operation points according to Embodiment 1 of the present invention.

As shown in FIG. 1, the method for providing information of SVC operation points according to the embodiment includes the following steps:

Step 101: Generate an SDP message, where the SDP message includes a unique ID of each operation point and characteristic parameters of at least one operation point of multiple operation points, and the unique ID includes a layer-ID.

Step 102: Send the SDP message.

Figure 2:
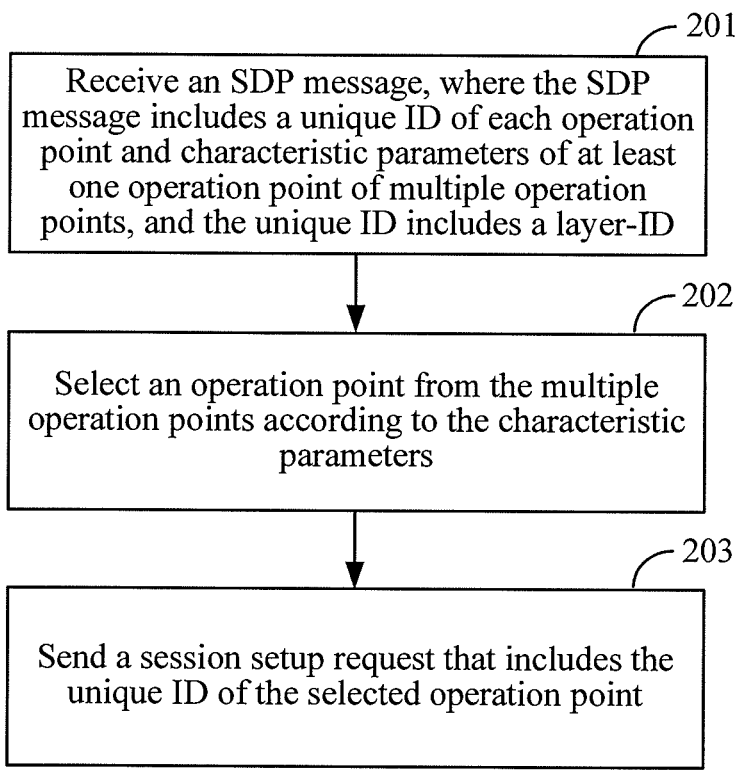
FIG. 2 is a flowchart of a method for selecting an SVC operation point according to Embodiment 1 of the present invention.

As shown in FIG. 2, the method for selecting an SVC operation point according to the embodiment includes the following steps:

Step 201: Receive an SDP message, where the SDP message includes a unique ID of each operation point and characteristic parameters of at least one operation point of multiple operation points, and the unique ID includes a layer-ID.

Step 202: Select an operation point from the multiple operation points according to the characteristic parameters.

Step 203: Send a session setup request that includes the unique ID of the selected operation point.

In the foregoing embodiment of the present invention, the SDP message includes a unique ID of each operation point and characteristic parameters of at least one operation point of the multiple operation points, where the unique ID includes a layer-ID. In this way, the file storage mode is unlimited, and each operation point can be uniquely identified no matter whether each operation point has a corresponding media track or extraction track, which improves the flexibility of SVC streams and file formats and clarifies the mapping relationship between each operation point and characteristic parameters. In addition, for the live streaming applications not using the file format, each SVC operation point can also be identified uniquely.

When SVC is used in streaming applications, the streaming server needs to fully provide the client with information of multiple SVC operation points, so that the client selects a proper SVC operation point. In addition, the client needs to uniquely identify the selected SVC operation point from the server.

For different forms of SVC content sources, different methods for identifying an operation point are required. For streaming applications not using the file format, the layer-ID in the parameter of stream operation point information may be directly used to identify different sub-streams, for example, if layer-ID is equal to 1, it indicates the first operation point.

For content sources stored in the SVC file format, the layer-ID in the operation point information may be directly used to identify different sub-streams. In a specific example, the foregoing ID may also include a track-ID. That is, the combination of track-ID and layer-ID (track-ID/layer-ID) may be used to indicate each operation point, where the "1" symbol in the SDP description language indicates an "And" relationship, that is, the track-ID and the layer-ID are used together to indicate each operation point. The track-ID identifies a storage track of an SVC stream or part of the SVC stream in the SVC file, while the layer-ID identifies a specific SVC operation point. This method is applicable to the storage mode specified by the SVC file format.

During the implementation, the mapping relationship between each operation point and characteristic parameters in the SDP message needs to be clarified. In addition, the length of the protocol information involved in a negotiation process between the server and the client should be minimized to speed up the negotiation process as much as possible and reduce the initial delay. In a specific example, the SDP message including the unique ID of each operation point and characteristic parameters of at least one operation point of multiple operation points may include:

according to the sequence of operation points provided in the parameter of stream operation point information:

listing the characteristic parameter values of each operation point of the multiple operation points sequentially in each characteristic parameter item of the SDP message; and listing the unique ID of each operation point of the multiple operation points sequentially in the stream ID of the SDP message.

In another specific example, the SDP message including the unique ID of each operation point and characteristic parameters of at least one operation point of multiple operation points may further include:

including the characteristic parameter values and corresponding layer-IDs of each operation point of the multiple operation points in each characteristic parameter item of the SDP message; and including the unique ID of each operation point in the multiple operation points in the stream ID of the SDP message.

In this way, the mapping relationship between each operation point and characteristic parameters may be clarified. In addition, when the SVC content source provides a lot of operation points, the length of the SDP description information is shortened, which reduces the streaming setup time and initial delay.

The following describes the basic application method of this embodiment. After receiving a request for a content source, the server may generate the SDP message; after the server sends the SDP message, the method may further include: receiving a session setup request, where the session setup request includes the unique ID of an operation point of the multiple operation points; extracting a corresponding media stream according to the unique ID of the operation point in the session setup request; and sending the media stream.

The client may send a request for a content source before receiving the SDP message; after the client sends a session setup request, the method may further include: receiving a media stream corresponding to the unique ID of the operation point in the session setup request.

Figure 3:
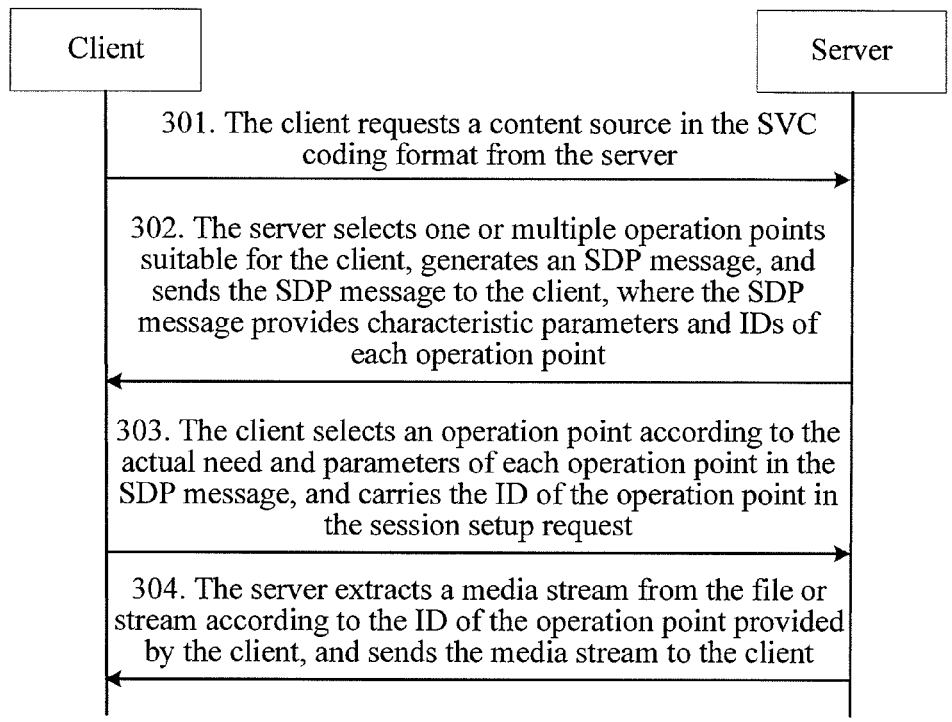
FIG. 3 is a flowchart of a basic application of SVC in streaming services according to Embodiment 1 of the present invention.

The following describes a process of a basic application of SVC in streaming services. As shown in FIG. 3, the process may include the following steps.

Step 301: The client requests the server for a certain content source, where the content source is in an SVC coding format.

Step 302: The server sends an SDP message to the client, where the SDP message provides characteristic parameters and the unique ID of each operation point.

As mentioned before, three methods for identifying an operation point exist, including layer-ID, track-ID, and track-ID/layer-ID.

Each operation point is transmitted as a stream and has its own characteristic parameters and attributes, for example, a required maximum application bandwidth, an audio/video buffer size, and a transmission format. These parameters are important bases for the client to select an operation point. Therefore, the parameter values of each operation point need to be described in the SDP message. To control the length of the SDP message, the methods for expressing the SDP parameters are extended in this embodiment. Multiple extension methods are available. The following describes several methods for defining the syntax structure.

Method 1: The parameter values of each operation point in the SDP lines corresponding to the parameters needed by the operation points are provided according to a certain sequence (for example, sequentially or as agreed), and a mapping relationship is formed between these parameter values and the operation point information provided by the stream. Each parameter is separated by a comma. For example, the syntax structure of the bandwidth parameter b=TIAS may be expressed as follows:
TIAS-bandwidth-def="b" "=" "TIAS" ":" bandwidth-value (","bandwidth-value) CRLF
   bandwidth-value=1*DIGIT.

Method 2: The layer-IDs and corresponding characteristic parameter values/stream IDs of each operation point in the SVC stream are provided in the form of a parameter pair. Even if only the characteristic parameters/stream IDs of some operation points can be provided in the SDP message, this method can also clarify the mapping relationship between the characteristic parameters and the stream IDs. For example, the syntax structure of the bandwidth parameter b=TIAS may be expressed as follows:
TIAS-bandwidth-def="b" "=" "TIAS" ":" Parameter_pair *("," Parameter_pair) CRLF
Parameter_pair="<"op-id","bandwidth-value">"
   where, op-id=1*DIGIT; layer-ID of the operation point provided in the stream;
   bandwidth-value=1*DIGIT; TIAS bandwidth needed by the stream corresponding to the operation point.

The op-id indicates a layer-ID of an operation point provided in the SVC stream. Specifically, the op-id is a layer-ID provided in the parameter of stream operation point information or the Scalability Information SEI Message. The bandwidth-value provides the TIAS value needed by the operation point identified by the layer-ID.

In the second method, the Parameter_pair may adopt other forms, for example:
Parameter_pair="<"op-id ">" ";" "<"bandwidth-value">"
Parameter_pair=op-id";"bandwidth-value Similarly, as for each characteristic parameter or attribute related to the operation points, the values needed by each operation point may be also provided in the SDP line corresponding to any one of the foregoing methods; however, each parameter in the same SDP message should use the same expression method, such as b=AS, a=control, and a=X-init-predecbufperiod in the following SDP examples.

Step 303: After the client obtains the SDP message, the client selects an operation point according to the parameters of each operation point provided in the SDP message, and carries the ID of the operation point in the session setup request.

Step 304: The server receives a session setup request sent from the client, obtains the ID of the operation point from the session setup request, extracts a corresponding stream from the content source according to the ID, and sends the stream to the client.

Embodiment 2

In this embodiment, some specific examples are used to describe the specific implementation of the method provided in Embodiment 1. The basic process of selecting an SVC operation point in Embodiment 1 and the method for expressing the SDP parameters of each operation point are still applicable to this embodiment.

Example 1

In this example, the streaming server has a content source S2, which uses the SVC coding format and is stored as an SVC file. In the SVC file, the whole SVC stream is stored as a media track with a track-ID equal to 1, and there may or may not be a meta data track to provide some stream information. The SVC file may be stored according to a sample grouping mode. The track-ID identifies a storage position of the media in the SVC file, and the layer-ID identifies different operation points. In the sample grouping storage mode, the mapping relationship between the layer-ID and the tier-ID may be obtained by the server, and is not reflected in the signaling.

The client initiates a request for the S2 to the server, and the server sends an SDP message including six operation points to the client. The layer-IDs of the six operation points are 1 to 6 respectively. The server provides the client with the parameter information and ID of each operation point in the SDP message for selection. In this example, the operation points are identified by the combination of the track-ID and the layer-ID, for example:
   v=0
   o=alice 2890844526 2890844526 IN IP4 192.0.2.12
   s=SVC SDP example
   i=SVC Scalable Video Coding session
   c=IN IP4 192.0.2.12
   t=0 0
   m=video 20000 RTP/AVP 97
   b=AS: 280,360,450,530,620,660//corresponding to the AS values needed by each operation point in sprop-operation-point-info sequentially
   b=TIAS: 260000,345000,425000,520000,600000, 645000//corresponding to the TIAS values needed by each operation point sequentially
   a=maxprate: 25,30,35,40,45,50
   a=control: track-ID=1 a=rtpmap: 97 H264-SVC/90000
a=fmtp: 97 profile-level-id=53000c; packetization-mode=1; sprop-parameter-sets={sps0},{sps1},{sps2},{pps0},{pps1},{pps2}; sprop-operation-point-info=
<1,0,0,0,4d400a,3200,176,144,128,256>,
<2,0,0,1,4d400a,3200,176,144,176,340>,
<3,1,0,1,4d400a,6400,176,144,224,420>,
<4,1,1,0,530000,6400,352,288,256,512>,
<5,1,1,1,530000,6400,352,288,320,596>,
<6,1,1,2,53000c,6400,352,288,384, 640>
a=X-initpredecbufperiod: 9000, 9000,13500,13500,18000,18000

In the foregoing SDP message, if sprop-operation-point-info is replaced with sprop-scalability-info, and "a=control: track-ID=1" is replaced with "a=control:track-ID=1/layer-ID=1,track-ID=1/layer-ID=2,track-ID=1/layer-ID=3,track-ID=1/layer-ID=4, track-ID=1/layer-ID=5,track-ID=1/layer-ID=6", the same effect may be achieved.

By using the information provided in the foregoing SDP message, the client selects an operation point. For example, if the layer-ID is equal to 6, the client carries "track-ID=1/layer-ID=6" in the URL of the SETUP request to identify the operation point.

In this example, the first method in Embodiment 1 is used to express the parameters of each operation point. If the second method in Embodiment 1 is used, related parameters of each operation point may be expressed as follows:
b=AS:
<1,280>,<2,360>,<3,450>,<4,530>,<5,620>,<6,660>
b=TIAS:
<1,260000>,<2,345000>,<3,425000>,<4,520000>,
<5,600000>,<6,645000>
a=maxprate:
<1,25>,<2,30>,<3,35>,<4,40>,<5,45>,<6,50>
a=X-initpredecbufperiod:
<1,9000>,<2,9000>,<3,13500>,<4,13500>,<5,18000>,
<6,18000>

The stream ID of each operation point in the "a=control" line may be expressed as follows according to the foregoing method: a=control: <1,track-ID=1>,<2,track-ID=1>,<3,track-ID=1>,<4,track-ID=1>, <5,track-ID=1>,<6,track-ID=1>. In this method, the first parameter in "< >" is the layer-ID. In fact, the stream ID of the operation point corresponding to layer-ID=6 is still track-ID=1/layer-ID=6.

Other examples in this embodiment and parameters in other embodiments of the present invention may also use the foregoing expression method.

Example 2

In this example, the streaming server provides a content source S3. The S3 content source is encoded in real time, or is a live stream received directly from other media networks, or an encoded stream stored on the server. The S3 uses the SVC coding format, whose hierarchical coding structure can meet the requirements of clients with different capabilities. When the client requests the S3, the server extracts a needed stream subset from the S3 in real time, and sends the stream subset to the client.

A client initiates a request for the S3 to the server. The client supports six operation points at most, with the layer-IDs of these six operation points being 1 to 6 respectively. The basic session process in Embodiment 1 is still applicable to this embodiment. The difference is that the content source uses the form of an original video stream and the operation point is identified directly by the layer-ID, The following is an example:

v=0
o=alice 2890844526 2890844526 IN IP4 192.0.2.12
s=SVC SDP example
i=SVC Scalable Video Coding session
c=IN IP4 192.0.2.12
t=0 0
m=video 20000 RTP/AVP 97
b=AS: 280,360,450,530,620,660//corresponding to the AS values needed by each operation point in sprop-operation-point-info sequentially
b=TIAS: 260000,345000,425000,520000,600000, 645000//corresponding to the TIAS values needed by each operation point sequentially
a=maxprate: 25,30,35,40,45,50
a=control: layer-ID=1,layer-ID=2,layer-ID=3,laye-ID=4, laye-ID=5,layer-ID=6
a=rtpmap: 97 H264-SVC/90000
a=fmtp: 97 profile-level-id=53000c; packetization-mode=1; sprop-parameter-sets={sps0},{sps1},{sps2}, {pps0},{pps1},{pps2}; sprop-operation-point-info=<1,0,0, 0,4d400a,3200,176,144,128,256>,
<2,0,0,1,4d400a,3200,176,144,176,340>,
<3,1,0,1,4d400a,6400,176,144,224,420>,
<4,1,1,0,53000c,6400,352,288,256,512>,
<5,1,1,1,530000,6400,352,288,320,596>,
<6,1,1,2,53000c,6400,352,288,384,640>
a=X-initpredecbufperiod: 9000, 9000,13500,13500,18000,18000

Because the operation point may be identified directly by the layer-ID, "a=control:" may be omitted, and sprop-operation-point-info may be replaced with sprop-scalability-info. Each attribute parameter may be expressed by using the second parameter expression method in Embodiment 1.

The client selects an operation point, for example, the operation point corresponding to layer-ID=5, and therefore, "layer-ID=5" is carried in the URL of the SETUP request to identify the operation point.

Example 3

In this example, the content source on the server is stored as an SVC file format, and the whole stream is stored as a media track or according to the sample grouping mode. The track-ID identifies the storage location of the media in the SVC file, and the layer-ID identifies different operation points. In the sample grouping storage mode, the mapping relationship between the layer-ID and the tier-ID may be obtained by the server and is not reflected in the signaling.

The following is an SDP message that the server provides to the client:
m=video 20000 RTP/AVP 97
b=AS: 550//bandwidth information corresponding to the maximum operation point
b=TIAS: 52000//parameter value corresponding to the maximum operation point
a=maxprate: 50//parameter value corresponding to the maximum operation point
a=rtpmap: 97 H264-SVC/90000
a=control: track-ID=1
a=fmtp: 97 profile-level-id=53000c; packetization-mode=1;
sprop-parameter-sets={sps0},{sps1},{pps0},{pps1};
sprop-operation-point-info=<1,0,0,0,4d400a,3200,176, 144,128,256>,<2,1,1,0,53000c,6400,352,288,256,512>

The client selects a certain operation point that needs to be identified by the combination of the track-ID and the layer-ID. For example, if the client selects an operation point corresponding to layer-ID=1 in this example, the client needs to carry "track-ID=1/layer-ID=1" in the request signaling. In this way, the server can find a corresponding sub-stream in the SVC file.

This example is different from the second example in that, in this example, only the characteristic parameters corresponding to the maximum operation point are provided; parameter values needed by other operation points are already estimated by the client according to the existing parameters. The method for only providing the characteristic parameters of the maximum operation point is also applicable to the first and the second examples. Certainly, during the implementation, the SDP message may also carry the characteristic parameters of other operation points in addition to the characteristic parameters of the maximum operation point. That is, the SDP message only needs to include the characteristic parameters of at least one operation point of multiple operation points, and the client can fully estimate parameter values needed by other operation points according to the existing parameters.

If the second parameter expression method in Embodiment 1 is used, related parameters of the maximum operation point in this example may be expressed as follows:

b=AS: <1,550>//bandwidth information corresponding to the maximum operation point
b=TIAS: <1,52000>//parameter value corresponding to the maximum operation point
a=maxprate: <1,50>//parameter value corresponding to the maximum operation point
a=control: <1,track-ID=1>

Example 4

In this example, the streaming server has a content source S4. The S4 uses an SVC coding format, and is stored as an SVC file. The track-ID identifies an SVC stream or the storage track of part of the SVC stream in the SVC file, and the layer-ID identifies a specific SVC operation point.

The client initiates a request for the S4 to the server, and the server sends an SDP message including two operation points to the client. The operation points need to be identified by the combination of the track-ID and the layer-ID, that is, track-ID=1/layer-ID=1 and track-ID=1/layer-ID=2. The parameters of each operation point are provided by using the alt attribute, as shown in the following example:

v=0
o=alice 2890844526 2890844526 IN IP4 192.0.2.12
s=SVC SDP example
i=SVC Scalable Video Coding session
c=IN IP4 192.0.2.12
t=0 0
m=video 20000 RTP/AVP 97
b=AS: 550
b=TIAS: 520000
a=maxprate: 50
a=range: npt=0-150.2
a=control: track-ID=1/layer-ID=2
a=rtpmap: 97 H264-SVC/90000
a=fmtp: 97 profile-level-id=53000c; packetization-mode=1; sprop-parameter-sets={sps0},{sps1},{pps0},{pps1}; svc-operation-point-info=
<1,0,0,0,4d400a,3200,176,144,128,256>,
<2,1,1,0,53000c,6400,352,288,256,512>
a=alt-default-id: 2
a=alt: 1: b=AS: 280
a=alt: 1: b=TIAS: 260000
a=alt: 1: a=maxprate: 25
a=alt: 1: a=control: track-ID=1/layer-ID=1

In the foregoing SDP message, sprop-operation-point-info may be replaced with sprop-scalability-info to achieve the same effect.

By using the information provided in the foregoing SDP message, the client selects an operation point. For example, if the layer-ID is equal to 1, the client carries "track-ID=1/layer-ID=1" in the URL of the SETUP request to identify the operation point.

When each operation point has a corresponding track-ID in the SVC file but the parameters of each operation point are provided by using the alt attribute, to provide the mapping relationship between the operation point information svc-operation-point-info and other information of operation points provided by the SDP message, an operation point may also be identified by the combination of the track-ID and the layer-ID in this example. If the server sends an SDP message including two operation points to the client, the layer-IDs of these two operation points are 1 and 2 respectively, and the track-IDs of these two operation points in the SVC file are 4 and 3 respectively. Then, "track-ID=4/layer-ID=2" and "track-ID=3/layer-ID=1" are used to identify an operation point respectively. The following is an example:

m=video 20000 RTP/AVP 97
b=AS: 550
b=TIAS: 520000
a=maxprate: 50
a=range: npt=0-150.2
a=control: track-ID=3/layer-ID=2
a=X-initpredecbufperiod: 18000
a=rtpmap: 97 H264-SVC/90000
a=fmtp: 97 profile-level-id=53000c; packetization-mode=1; sprop-parameter-sets={sps0},{sps1},{pps0},{pps1}; svc-operation-point-info=
<1,0,0,0,4d400a,3200,176,144,128,256>,
<2,1,1,0,53000c,6400,352,288,256,512>
a=alt-default-id: 2
a=alt: 1: b=AS: 280
a=alt: 1: b=TIAS: 260000
a=alt: 1: a=maxprate: 25
a=alt: 1: a=control: track-ID=4/layer-ID=1
a=alt: 1: a=X-initpredecbufperiod: 9000

The SDP description in this example may also be applicable to the application processes in other embodiments.

Example 5

In this example, the streaming server provides a content source S5. The S5 uses the SVC coding format, but the S5 is not stored as an SVC file. The S5 may be streams encoded in real time, or video streams received from other networks, or video bit streams stored directly. In these cases, an operation point may be identified directly by using the layer-ID.

The client initiates a request for the S5 to the server, and the server sends an SDP message including two operation points to the client. The layer-IDs of these two operation points are 1 and 2 respectively. The parameters of each operation point are provided by using the alt attribute, as shown in the following example:

v=0
o=alice 2890844526 2890844526 IN IP4 192.0.2.12
s=SVC SDP example
i=SVC Scalable Video Coding session
c=IN IP4 192.0.2.12
t=0 0
m=video 20000 RTP/AVP 97
b=AS: 550 b=TIAS: 520000
a=maxprate: 50
a=range: npt=0-150.2
a=control: layer-ID=2
a=X-initpredecbufperiod: 18000
a=rtpmap: 97 H264-SVC/90000
a=fmtp: 97 profile-level-id=53000c; packetization-mode=1; sprop-parameter-sets={sps0},{sps1},{pps0},{pps1}; svc-operation-point-info=
<1,0,0,0,4d400a,3200,176,144,128,256>,
<2,1,1,0,53000c,6400,352,288,256,512>
a=alt-default-id: 2
a=alt: 1: b=AS: 280
a=alt: 1: b=TIAS: 260000
a=alt: 1: a=maxprate: 25
a=alt: 1: a=control: layer-ID=1
a=alt: 1: a=X-initpredecbufperiod: 9000

In the foregoing SDP message, sprop-operation-point-info may be replaced with sprop-scalability-info to achieve the same effect.

By using the information provided in the foregoing SDP message, the client selects an operation point. For example, if the layer-ID is equal to 2, the client carries "layer-ID=2" in the URL of the SETUP request to identify the operation point.

The SDP description in this example may also be applicable to the application processes in the foregoing examples.

Embodiment 3

Figure 4:
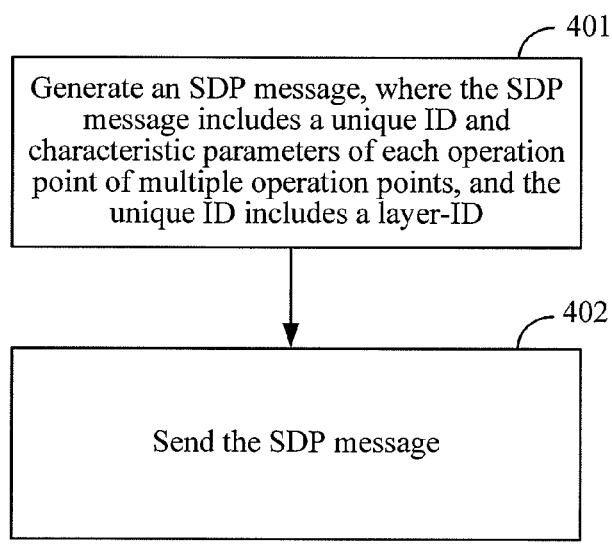
FIG. 4 is a flowchart of a method for providing information of SVC operation points according to Embodiment 3 of the present invention.

As shown in FIG. 4, the method for providing information of SVC operation points according to Embodiment 3 includes the following steps:

Step 401: Generate an SDP message, where the SDP message includes a unique ID and characteristic parameters of each operation point of multiple operation points, and the unique ID includes a track-ID. According to a sequence of the operation points in the parameter of stream operation point information, the characteristic parameter values of each operation point of the multiple operation points are listed sequentially in each characteristic parameter item of the SDP message; the unique ID of each operation point of the multiple operation points is listed sequentially in the stream ID of the SDP message; or the characteristic parameter values and corresponding layer-IDs in each operation point of the multiple operation points are included in each characteristic parameter item of the SDP message; the unique ID of each operation point of the multiple operation points is included in the stream ID of the SDP message.

Step 402: Send the SDP message.

Figure 5:
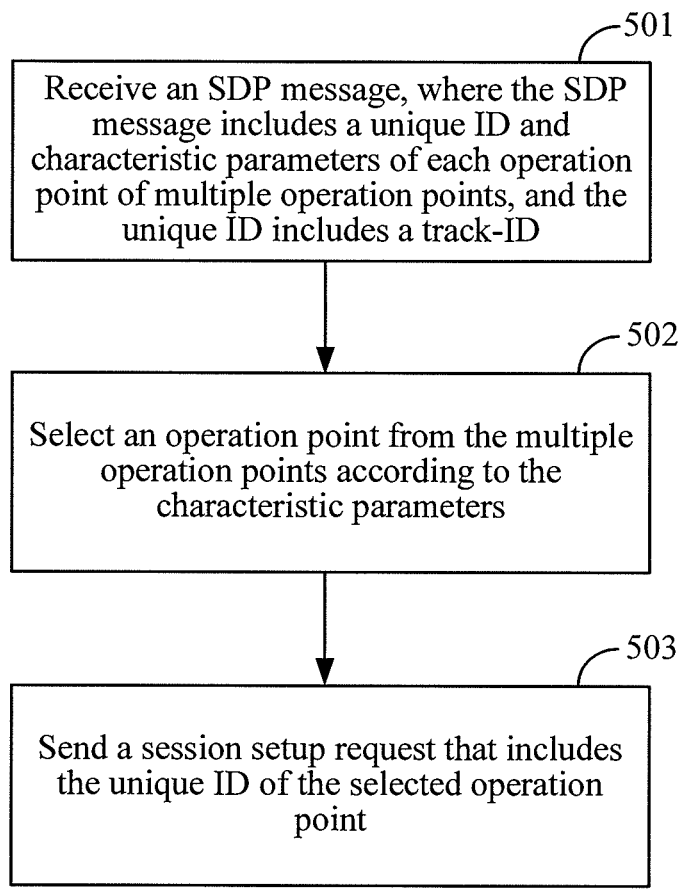
FIG. 5 is a flowchart of a method for selecting an SVC operation point according to Embodiment 3 of the present invention.

As shown in FIG. 5, the method for selecting an SVC operation point provided in this embodiment includes the following steps:

Step 501: Receive an SDP message, where the SDP message includes a unique ID and characteristic parameters of each operation point of multiple operation points, and the unique ID includes a track-ID. According to the sequence of the operation points in the parameter of stream operation point information, the characteristic parameter values of each operation point of the multiple operation points are listed sequentially in each characteristic parameter item of the SDP message; the unique ID of each operation point of the multiple operation points is listed sequentially in the stream ID of the SDP message; or the characteristic parameter values and corresponding layer-IDs in each operation point of the multiple operation points are included in each characteristic parameter item of the SDP message; the unique ID of each operation point of the multiple operation points is included in the stream ID of the SDP message.

Step 502: Select an operation point from the multiple operation points according to the characteristic parameters.

Step 503: Send a session setup request that includes the unique ID of the selected operation point.

In the foregoing embodiment, the mapping relationship between each operation point and characteristic parameters may be clarified. In addition, when the SVC content source provides a lot of operation points, the length of the SDP description information is shortened, which reduces the streaming setup time and initial delay.

The operation points may be identified by using different methods according to different file storage modes. The unique ID of an operation point includes a track-ID in this embodiment. For example, an extraction track or a hint track may be used, and the track may include a copy of video data or some indication information; by using the indication information, required video data is obtained from other tracks. Generally, common operation point information is stored as the extraction track. In this case, an operation point may be identified directly by the track-ID.

The following describes the basic application method of this embodiment. After receiving a request for a content source, the server may generate the SDP message; after the server sends the SDP message, the method may further include: receiving a session setup request, where the session setup request includes the unique ID of an operation point of the multiple operation points; extracting a corresponding media stream according to the unique ID of the operation point in the session setup request; and sending the media stream.

The client may send a request for a content source before receiving the SDP message; after the client sends a session setup request, the method may further include: receiving a media stream corresponding to the unique ID of the operation point in the session setup request.

Embodiment 4

This embodiment describes the specific implementation of the method provided in Embodiment 3 by taking some examples.

In this embodiment, the streaming server provides a content source S1. The S1 uses the SVC coding format and is stored in an SVC file format. The SVC file provides the media tracks or extraction tracks of four operation points of the S1. That is, each operation point may be uniquely identified by a track-ID in the SVC file, and the track-IDs of the four operation points are 1, 2, 3, and 4 respectively.

Figure 6:
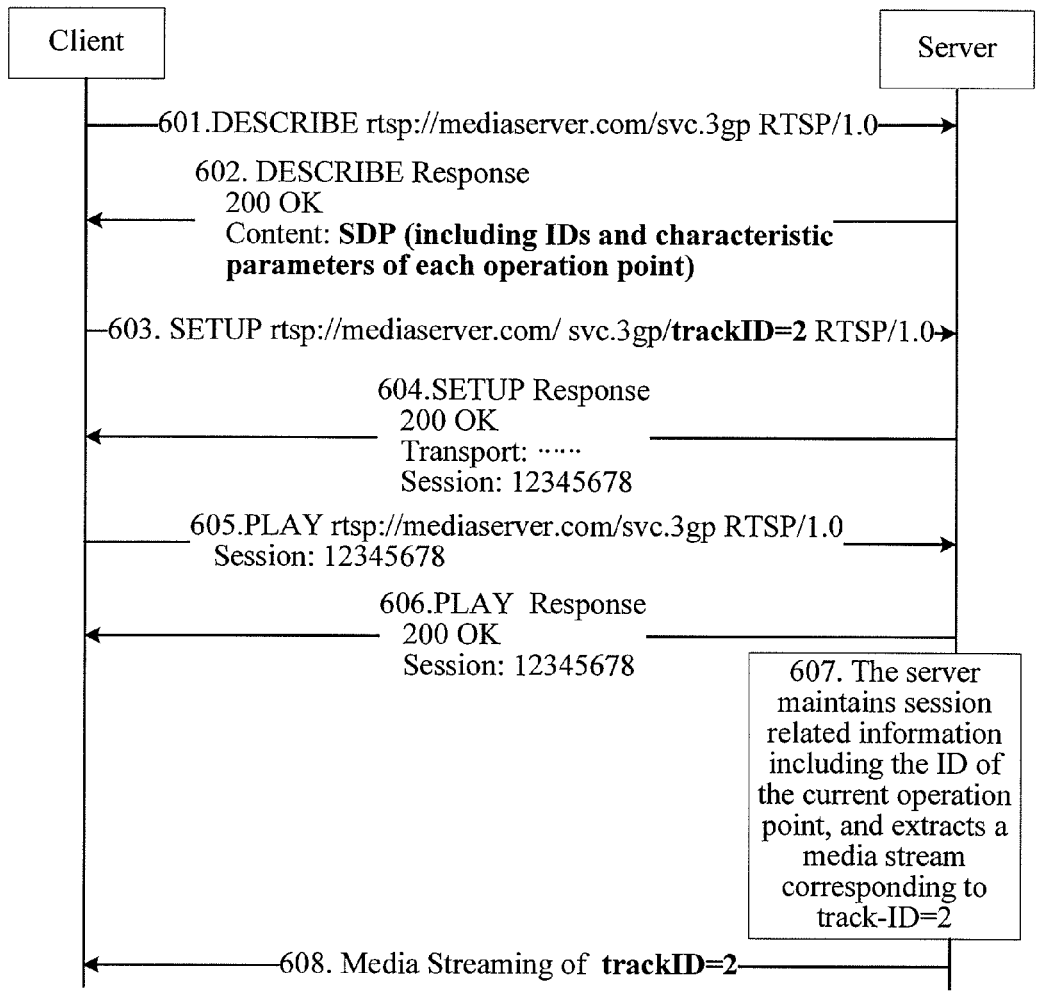
FIG. 6 is a flowchart of a basic application of SVC in streaming services according to Embodiment 4 of the present invention.

The client initiates a request for the S1 to the server through RTSP signaling, and the server sends an SDP message describing the S1 to the client. To shorten the length of the SDP description information, the server may also determine that two operation points of the S1 are within the capability range of the client according to the network bandwidth and the maximum capability of the terminal, where the two operation points have the track-IDs of 1 and 2, generate a corresponding SDP message, and send the SDP message to the client. As shown in FIG. 6, the process of a basic application of SVC in streaming services based on the RTSP includes the following steps:

Step 601: The client initiates a request for a content source.

Step 602: The server provides an SDP message that includes stream parameters, characteristic parameters, and IDs of each operation point, and the forms thereof are shown in the following SDP message. The layer-IDs of operation points corresponding to track-ID=1 and track-ID=2 are 1 and 2 respectively. The stream information of the operation points is described in the sprop-operation-point-info parameter. Each operation point has different characteristic parameters, for example, maximum application bandwidth (b=AS), maximum bandwidth irrelevant to the transmission (b=TIAS), maximum packet rate (a=maxprate), and each video buffer parameter. These characteristic parameters are listed sequentially according to the sequence of the operation points in sprop-operation-point-info, and separated by a comma. The unique IDs and track-IDs of each operation point are also listed sequentially in the SDP line a=control.

As for the methods for expressing the characteristic parameters and stream IDs involved in this embodiment, reference may be made to the parameter expression methods in Embodiment 1.

v=0
o=alice 2890844526 2890844526 IN IP4 192.0.2.12
s=SVC SDP example
i=SVC Scalable Video Coding session
c=IN IP4 192.0.2.12
t=0 0
m=video 20000 RTP/AVP 97
b=AS: 280, 550//corresponding to the AS values needed by each operation point in sprop-operation-point-info sequentially
b=TIAS: 260000,520000//corresponding to the TIAS values, needed by each operation point in sprop-operation-point-info sequentially
    a=maxprate: 25,50
    a=control: track-ID=1, track-ID=2
    a=rtpmap: 97 H264-SVC/90000
    a=fmtp: 97 profile-level-id=53000c; packetization-mode=1;
sprop-parameter-sets={sps0},{sps1},{pps0},{pps1};
sprop-operation-point-info=<1,0,0,0,4d400a,3200,176,144,128,256>,<2,1,1,0,53000c,6400,352,288,256,512>
    a=X-initpredecbufperiod: 18000,27000
    a=X-predecbufsize: 640000,1280000
    a=X-initpostdecbufperiod: 9000,18000
    a=3gpp-videopostdecbufsize: 320000,640000

The parameters in this step may be expressed by using the parameter expression methods provided in Embodiment 1. For example, "a=control: track-ID=1, track-ID=2" may be expressed as follows:
    a=control: <1,track-ID=1>,<2,track-ID=2>

In the above parameters, "1" and "2" indicate the layer-ID of each operation point in the stream information.

Step 603: After the client parses the SDP message, the client obtains corresponding parameters of each operation point. The client selects an operation point corresponding to track-ID=2 according to these parameters, and carries "track-ID=2" of the operation point in the SETUP request. According to the mapping relationship, the operation point corresponding to layer-ID=2 is selected. The parameters in the SDP message of the selected operation point are as follows:
    m=video 20000 RTP/AVP 97
    b=AS: 550
    b=TIAS: 520000
    a=maxprate: 50
    a=control: track-ID=2
    a=rtpmap: 97 H264-SVC/90000
    a=fmtp: 97 profile-level-id=53000c; packetization-mode=1; sprop-parameter-sets={sps0},{sps1},{pps0},{pps1}; sprop-operation-point-info=<2,1,1,0,53000c,6400,352,288,256,512>
    a=X-initpredecbufperiod: 27000
    a=X-predecbufsize: 1280000
    a=X-initpostdecbufperiod: 18000
    a=3gpp-videopostdecbufsize: 64000

Step 604: The server confirms the SETUP request.

Step 605 to Step 606: The client sends a PLAY request and the server returns an OK message.

Step 607 to Step 608: The server needs to maintain the relationship between the session and the operation point selected by the client, finds a media stream corresponding to "track-ID=2" in the file, and sends the media stream to the client.

Embodiment 5

The method for providing information of operation points and method for selecting an operation point according to the foregoing embodiment are also applicable to such SVC applications as fast content switching, rate adaptation, and time-shift services.

Figure 7:
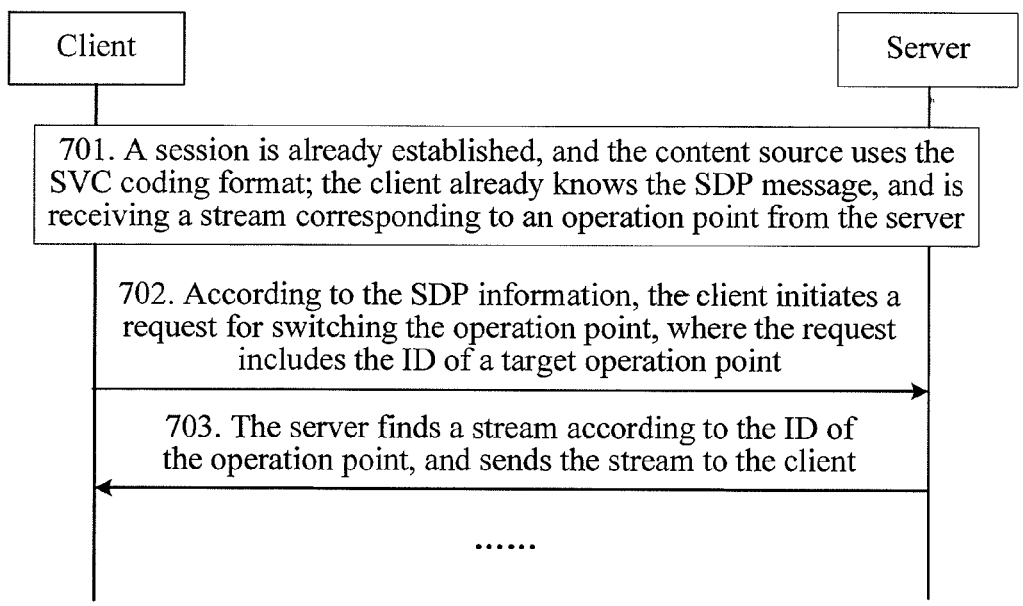
FIG. 7 is an application flowchart of SVC in fast content switching according to Embodiment 5 of the present invention.

The fast content switching includes fast content switching in the streaming service of the SVC content source in various forms, for example, VOD, live, and time shift. As shown in FIG. 7, the process of an application of SVC in fast content switching may include the following steps:

Step 701: A session is already set up successfully. The content source provided by the server uses the SVC coding format. The client already knows the SDP message, and is receiving a media stream sent from the server, where the SDP message provides multiple operation points and information of each operation point.

Step 702: In the session, the client needs to change the media stream for a reason. The client finds a proper operation point according to the information provided in the SDP message, and initiates a request that carries the ID of the operation point to the server.

Step 703: The server finds a stream according to the ID of the operation point, and sends the stream to the client.

The first example to the fourth example in Embodiment 2, the SDP extension method and the method for identifying the SVC operation point in Embodiment 4 may be applied in this embodiment.

Figure 8:
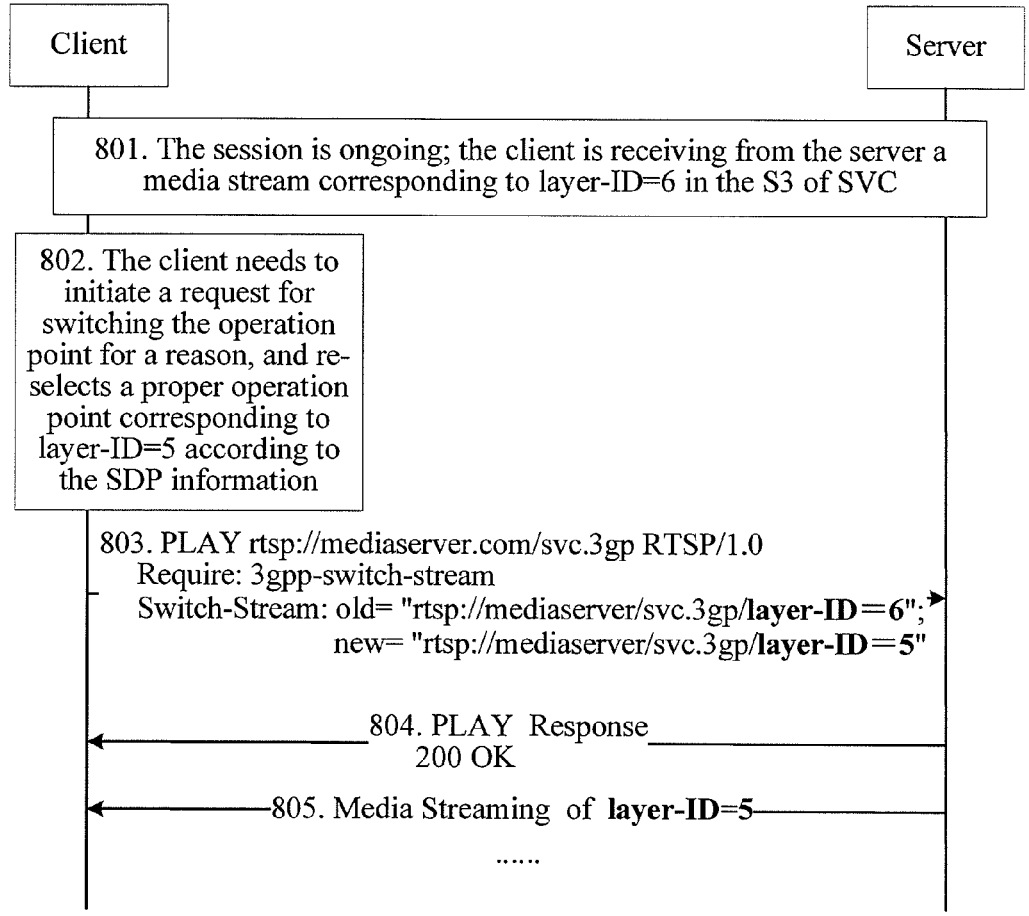
FIG. 8 is an application flowchart a specific example of SVC in fast content switching according to Embodiment 5 of the present invention.

The following describes a process of an application of SVC in fast content switching based on the second example in Embodiment 2. As shown in FIG. 8, the process includes the following steps:

Step 801: This process is based on the S3 provided in the second example of Embodiment 2 and the session process in Embodiment 4. It is assumed that the client is receiving a media stream corresponding to an operation point corresponding to "layer-ID=6".

Step 802: The client needs to initiate a request for switching the operation point for a reason. According to requirements and information of multiple operation points provided in an SDP message, for example, poorer link quality and lower available bandwidth, the client switches to an operation point corresponding to layer-ID=5 whose bandwidth meets the current available bandwidth condition.

Step 803: The client initiates a request for switching the operation point through a PLAY message by using the method for fast content switching in PSS, and indicates "layer-ID=6" of an operation point to be replaced in the old URL of the Switch-Stream header, and indicates "layer-ID=5" of a new operation point in the new URL.

Step 804 to step 805: The server agrees to the request of the client, and sends a stream corresponding to "layer-ID=5" of the operation point to the client.

During the rate adaptation, the server needs to provide the client with information of multiple streams used for rate adaptation. When the content source uses the SVC format, multiple operation points of one SVC content source correspond to different rates. In this example, the method for expressing the extended SDP parameters and the IDs of the SVC operation points in the signaling process may also be used to provide the information of rate adaptation.

Figure 9:
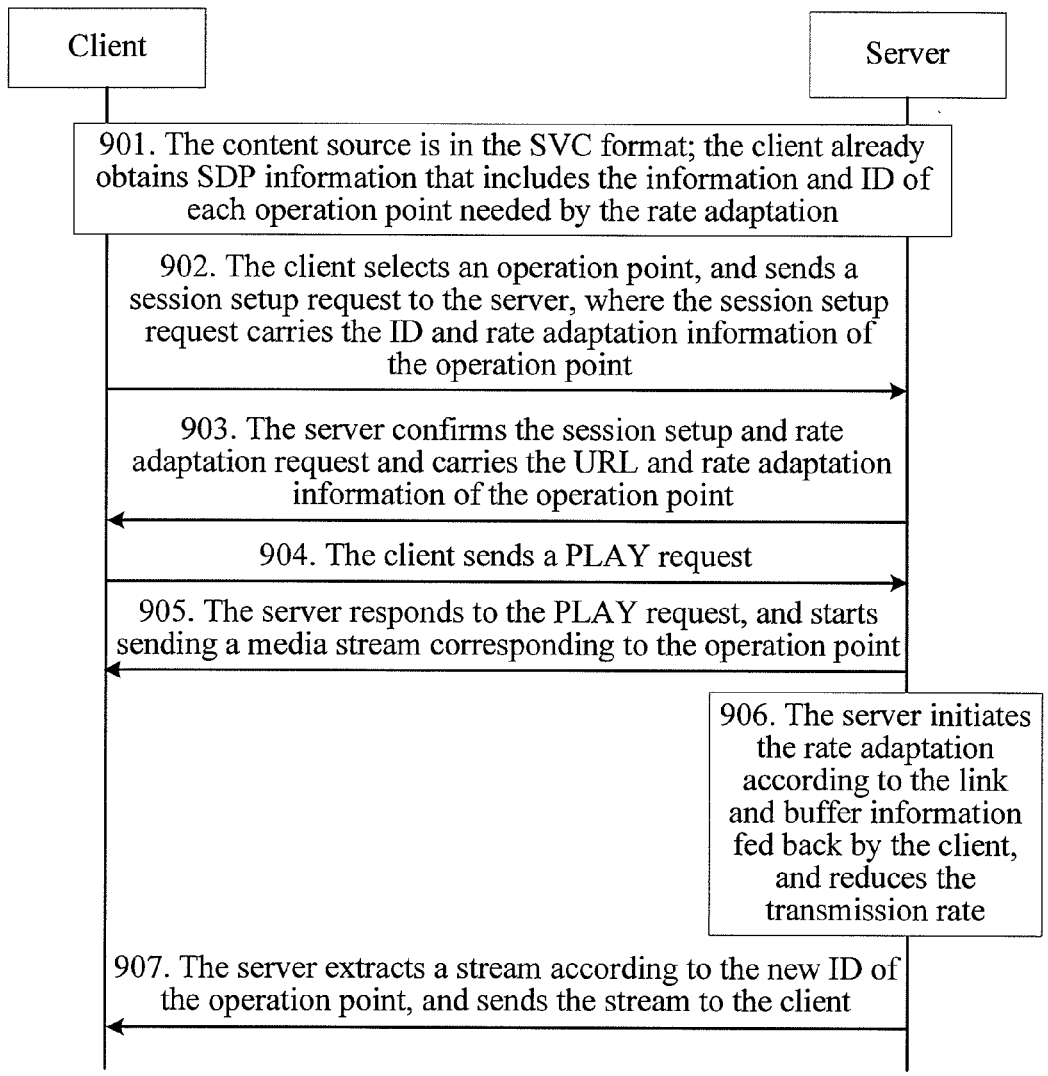
FIG. 9 is an application flowchart of SVC in rate adaptation according to Embodiment 5 of the present invention.

As shown in FIG. 9, the process of an application of SVC in rate adaptation may include the following steps:

Step 901: The client needs to obtain an SDP message that includes information of each adaptable stream (that is, each operation point) before the rate adaptation, where the SDP message indicates that the rate adaptation is supported.

Step 902: The client selects an operation point according to information of the operation points provided in the SDP message, carries the URL ID of the operation point in a session setup request, and carries the rate adaptation information of the operation point to indicate that the rate adaptation is supported.

Step 903: The server confirms the session setup request and carries the URL ID of the operation point and the rate adaptation information of the operation point to indicate that the rate adaptation request is confirmed.

Step 904: The client sends a PLAY request.

Step 905: The server extracts a stream according to the ID of the operation point selected by the client, and sends the stream to the client.

Step 906: When the server determines, according to the feedback information of the client, that the transmission rate needs to be changed, the server needs to select a proper operation point among the operation points (in the SDP message) that are already notified to the client.

Step 907: The server extracts a stream according to the new ID of the operation point, and sends the stream to the client.

The first example to the fourth example in Embodiment 2, the SDP extension method and the method for identifying the SVC operation point in a signaling message in Embodiment 4 may be applied in the rate adaptation. To implement rate adaptation, the server needs to provide the client with some information of the operation points in the SDP message. In addition to the bandwidth and buffer parameters provided in the foregoing embodiments, the server also needs to add the a=3GPP-Adaptation-Support parameter to the SDP message to indicate that the server supports the rate adaptation and the period in which the server requires the client to send a next application data unit (NADU) packet. If a parameter list is available, for example, a=3GPP-Adaptation-Support: 1,2,1, 2,1,2, different operation points require the client to feed back the NADU packet according to an RTCP period corresponding to the parameter value. If the parameter list is unavailable, for example, a=3GPP-Adaptation-Support: 1, all the operation points require the client to feed back the NADU packet according to the same RTCP period.

Figure 10:
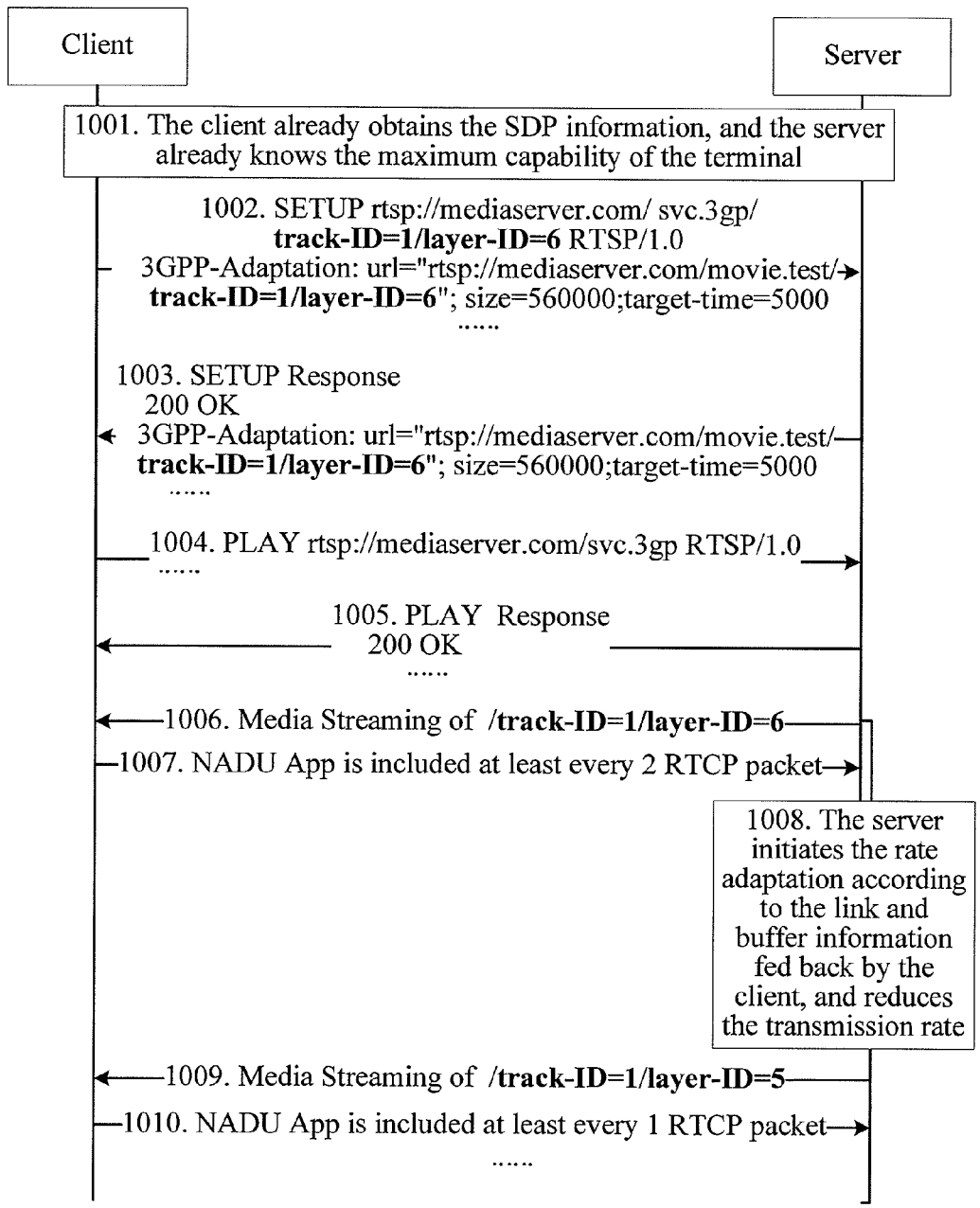
FIG. 10 is an application flowchart of a specific example of SVC in rate adaptation according to Embodiment 5 of the present invention.

FIG. 10 illustrates a process of an application of SVC in rate adaptation based on the S2 in the first example of Embodiment 2 and the process provided in Embodiment 4. The a=3GPP-Adaptation-Support parameter is added to the SDP description in the first example of Embodiment 2 to indicate that the rate adaptation is supported, and the period of feeding back the NADU packet is provided.

Step 1001: The SDP message obtained by the client includes information of each operation point that can undergo rate adaptation, for example, a=3GPP-Adaptation-Support, maximum capability of the client known by the server, and media stream corresponding to track-ID/layer-ID=6.

Step 1002: The client requests to establish a session transmission channel for track-ID=1/layer-ID=6 of the operation point, and provides the maximum buffer and target protection time of the current operation point in the 3GPP-Adaption.

Step 1003: The server gives a response to the SETUP request of the client, and carries the 3GPP-Adaption to confirm the maximum buffer and target protection time of the stream identified by track-ID/layer-ID=6.

Step 1004: The client sends a PLAY request and the server returns a response.

Step 1006: The server extracts a stream according to the track-ID=1/layer-ID=6 of the operation point carried in the request, and sends the stream to the client.

Step 1007: The client sends an ANDU App packet every at least two RTCP transmission periods according to the NADU App feedback period of 2 corresponding to the operation point provided in a=3GPP-Adaptation-Support of the SDP message.

Step 1008: According to the feedback information of the client, the server detects that the network link quality turns poorer and that the transmission rate needs to be adjusted. Then, the server selects a proper operation point that meets the current link quality in the SDP message provided to the client, where the operation point has the following ID information: track-ID=1 and layer-ID=5.

Step 1009: The server extracts a stream according to the new ID of the operation point, and sends the stream to the client.

Step 1010: Because a=3GPP-Adaptation-Suppor in the SDP message indicates that the period of feeding back an NADU App packet corresponding to the new ID track-ID=1/layer-ID=5 of the operation point is 1, the client needs to send an NADU App packet every RTCP transmission period.

When the SVC content source provides a time-shift service, clients with different capabilities share the same time shift buffer on the server. However, during the implementation, the server needs to record the streams of the whole SVC content source rather than a stream subset of a current online client. In this way, when the time-shift service is received on the client, the foregoing fast content (operation point) switching and rate adaptation mechanisms are still applicable.

For example, when the S3 in the second example of Embodiment 2 is a live stream, the time-shift service is available. The server stores the whole stream of the S3 rather than a stream subset needed by a current client in the time shift buffer. When the client requests the content in the time shift buffer, the server needs to extract a needed stream subset in real time according to the ID of the operation point selected by the client.

The foregoing fast content switching and rate adaptation mechanisms are also applicable to the time-shift service. Apparently, when the method for providing information of operation points and the method for selecting an operation point according to the foregoing embodiments are applied in the fast content switching, rate adaptation, and provision of time-shift services, each operation point may be uniquely identified, the mapping relationship between each operation point and characteristic parameters may be clarified, and the length of the SDP description information may be shortened.

It is understandable to persons of ordinary skill in the art that all or part of the steps in the methods according to the foregoing embodiments may be performed by hardware instructed by a program. The program may be stored in a computer readable storage medium. When the program runs, all or part of the steps of the methods may be executed. The storage medium may include a read only memory (ROM), a random access memory (RAM), a magnetic disk, and a compact disk-read only memory (CD-ROM).

Embodiments of the present invention also provide a server device and a client device. Details are given in Embodiment 6. Because the principles for solving problems by these devices are the same as the principles of the foregoing methods, the implementation of these devices may refer to the implementation of the foregoing methods, and is not further described.

Embodiment 6

Figure 11:
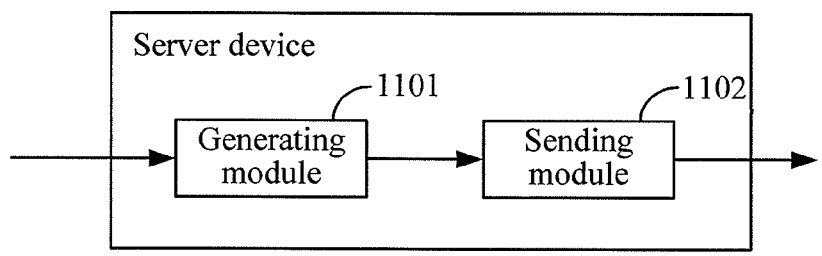
FIG. 11 is a schematic structure diagram of a server device according to Embodiment 6 of the present invention.

As shown in FIG. 11, the server device provided in this embodiment may include:

a generating module 1101, configured to generate an SDP message, where the SDP message includes a unique ID of each operation point and characteristic parameters of at least one operation point of multiple operation points, where the unique ID includes a layer-ID; and a sending module 1102, configured to send the SDP message.

In an embodiment, the unique ID includes a track-ID.

Figure 12:
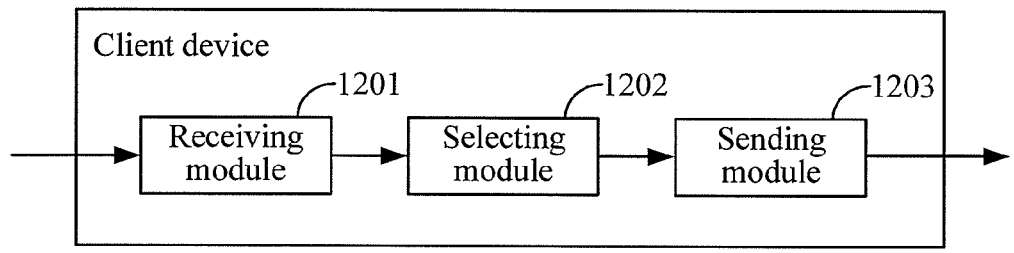
FIG. 12 is a schematic structure diagram of a client device according to Embodiment 6 of the present invention.

As shown in FIG. 12, the client device provided in this embodiment may include:

a receiving module 1201, configured to receive an SDP message, where the SDP message includes a unique ID of each operation point and characteristic parameters of at least one operation point of multiple operation points, where the unique ID includes a layer-ID;

a selecting module 1202, configured to select an operation point from the multiple operation points according to the characteristic parameters; and a sending module 1203, configured to send a session setup request that includes the unique ID of the selected operation point.

In an embodiment, the unique ID includes a track-ID.

This embodiment also provides a server device. The server device has the same structure as the server device shown in FIG. 11, and also includes a generating module 1101 and a sending module 1102.

The generating module 1101 is configured to generate an SDP message, where the SDP message includes a unique ID and characteristic parameters of each operation point of multiple operation points, where the unique ID includes a track-ID; and according to the sequence of operation points in the parameter of stream operation point information: the characteristic parameter values of each operation point of the multiple operation points are listed sequentially in each characteristic parameter item of the SDP message; the unique ID of each operation point of the multiple operation points is listed sequentially in the stream ID of the SDP message.

The sending module 1102 is configured to send the SDP message.

This embodiment also provides a client device. The client device has the same structure as the client device shown in FIG. 12, and also includes a receiving module 1201, a selecting module 1202, and a sending module 1203.

The receiving module 1201 is configured to receive an SDP message, where the SDP message includes a unique ID and characteristic parameters of each operation point of multiple operation points, where the unique ID includes a track-ID; and according to the sequence of operation points in the parameter of stream operation point information: the characteristic parameter values of each operation point of the multiple operation points are listed sequentially in each characteristic parameter item of the SDP message; the unique ID of each operation point of the multiple operation points is listed sequentially in the stream ID of the SDP message.

The selecting module 1202 is configured to select an operation point from the multiple operation points according to the characteristic parameters.

The sending module 1203 is configured to send an session setup request that includes the unique ID of the selected operation point.

In embodiments of the present invention, SVC is introduced in the streaming service, and the method for identifying an SVC operation point in the session signaling process and method for expressing the SDP parameters of each operation point of SVC are provided. With the present invention, multiple video presentations (that is, multiple operation points) may be provided in a stream, and the client is instructed to select an operation point in the session signaling.

In embodiments of the present invention, the SDP message includes a unique ID of each operation point and characteristic parameters of at least one operation point of multiple operation points, where the unique ID includes a layer ID. In this way, the file storage mode is unlimited, and each operation point can be uniquely identified no matter whether each operation point has a corresponding media track or extraction track, which improves the flexibility of SVC streams and file formats and clarifies the mapping relationship between each operation point and characteristic parameters. In addition, for the live streaming applications not using the file format, each SVC operation point can also be identified uniquely.

In embodiments of the present invention, according to the sequence of operation points in the parameter of stream operation point information: the characteristic parameter values of each operation point of the multiple operation points are listed sequentially in each characteristic parameter item of the SDP message; the unique ID of each operation point of the multiple operation points is listed sequentially in the stream ID of the SDP message; or the characteristic parameter values and corresponding layer-IDs in each operation point of the multiple operation points are included in each characteristic parameter item of the SDP message; the unique ID of each operation point of the multiple operation points is included in the stream ID of the SDP message. Therefore, the mapping relationship between each operation point and the characteristic parameters may be clarified. In addition, when the SVC content source provides a lot of operation points, the length of the SDP description information can be shortened, thus reducing the streaming setup time and initial delay.

The embodiments of the present invention may be applied in the streaming service process to implement fast content switching and rate adaptation of an SVC content source and fast content switching and rate adaptation in the time-shift service.

The foregoing embodiments describe the objective, technical solution, and benefits of the present invention in detail. It is understandable that these embodiments are only exemplary and are not intended to limit the scope of the present invention. All modifications and variations made without departing from the spirit and principle of the present invention shall fall within the scope of the present invention.

What is claimed is:

1. A method for providing information of scalable video coding (SVC) operation points, the method comprising:

according to a sequence of operation points provided in a parameter of stream operation point information, listing a characteristic parameter value of each operation point of multiple operation points sequentially in each characteristic parameter item of a Session Description Protocol (SDP) message;

wherein, when multiple characteristic parameter values correspond to their respective track ids, mapping the parameter of stream operation point information with the characteristic parameter value;

and according to the mapping result, uniquely identify, from stream identities of the SDP message, each operation point and a characteristic parameter of the operation point, by using the track id and a layer id in the parameter of stream operation point information, wherein a characteristic parameter of each operation point corresponds to a unique track id;

wherein, when the multiple characteristic parameter values correspond to one track id, listing the characteristic parameter value of each operation point of the multiple operation points sequentially in each characteristic parameter item of the SDP message further comprises:

mapping the parameter of stream operation point information with the characteristic parameter value, comprising a characteristic parameter value of each operation point of the multiple operation points sequentially in each characteristic parameter item of the SDP message, and allocating the layer id in the parameter of stream operation point information to each characteristic parameter value, so that a corresponding operation point can be directly determined when a characteristic parameter value is selected.

2. The method according to claim 1, wherein the unique ID further comprises a track-ID.

* * * * *